United States Patent [19]

Caillol

[11] Patent Number: 4,887,863
[45] Date of Patent: Dec. 19, 1989

[54] CONTINUOUS JOINT FOR VEHICLE SEAT WITH AUTOMATIC CLEARANCE COMPENSATION

[75] Inventor: André Caillol, Paris, France

[73] Assignee: Tubauto, Levallois-Perret, France

[21] Appl. No.: 128,425

[22] Filed: Dec. 3, 1987

[30] Foreign Application Priority Data

Dec. 3, 1986 [FR] France .................................. 86 16917

[51] Int. Cl.[4] .............................................. B60N 1/06
[52] U.S. Cl. ...................................... 297/362; 74/409; 74/805
[58] Field of Search .................. 297/362; 74/804, 805, 74/409, 440

[56] References Cited

U.S. PATENT DOCUMENTS

| | | | |
|---|---|---|---|
| 4,371,207 | 2/1983 | Wilking et al. | 297/362 X |
| 4,453,767 | 6/1984 | Walk et al. | 297/362 |
| 4,457,556 | 7/1984 | Klingehofer | 297/362 |
| 4,582,360 | 4/1986 | Becker | 297/362 |
| 4,612,822 | 9/1986 | Nishikawa et al. | 74/805 X |

FOREIGN PATENT DOCUMENTS

| | | | |
|---|---|---|---|
| 99549 | 2/1984 | European Pat. Off. | 297/362 |
| 0121452 | 5/1987 | European Pat. Off. | |
| 889094 | 7/1953 | Fed. Rep. of Germany | 74/440 |
| 3129672 | 10/1982 | Fed. Rep. of Germany | 297/362 |
| 1590551 | 5/1970 | France | |
| 2038595 | 1/1971 | France | |
| 2038803 | 1/1971 | France | |
| 2307495 | 11/1976 | France | 297/362 |
| 2412438 | 7/1979 | France | |
| 2107386 | 4/1983 | United Kingdom | 297/362 |

*Primary Examiner*—Peter R. Brown
*Attorney, Agent, or Firm*—Dennison, Meserole, Pollack & Scheiner

[57] ABSTRACT

Continuous joint for seat permitting compensation of clearances consisting of a fixed plate integral with the seat part and a moving plate integral with the back, this assembly capable of having an angular movement of one of the parts in relation to the other in which:

(a) An elastic bearing (19) is inserted between the eccentric constituting a cam (13, 22) and the part which it drives (4, 21).

(b) The central rotational shaft of the eccentric constituting a cam (13) has a flat part giving two opposite bearing points (17, 18) essentially at 120° in relation to each other on the interior zone of the hole (16) of the moving plate (2) in order to compensate for the tolerance clearances inherent in the manufacture of the continuous joint.

9 Claims, 3 Drawing Sheets

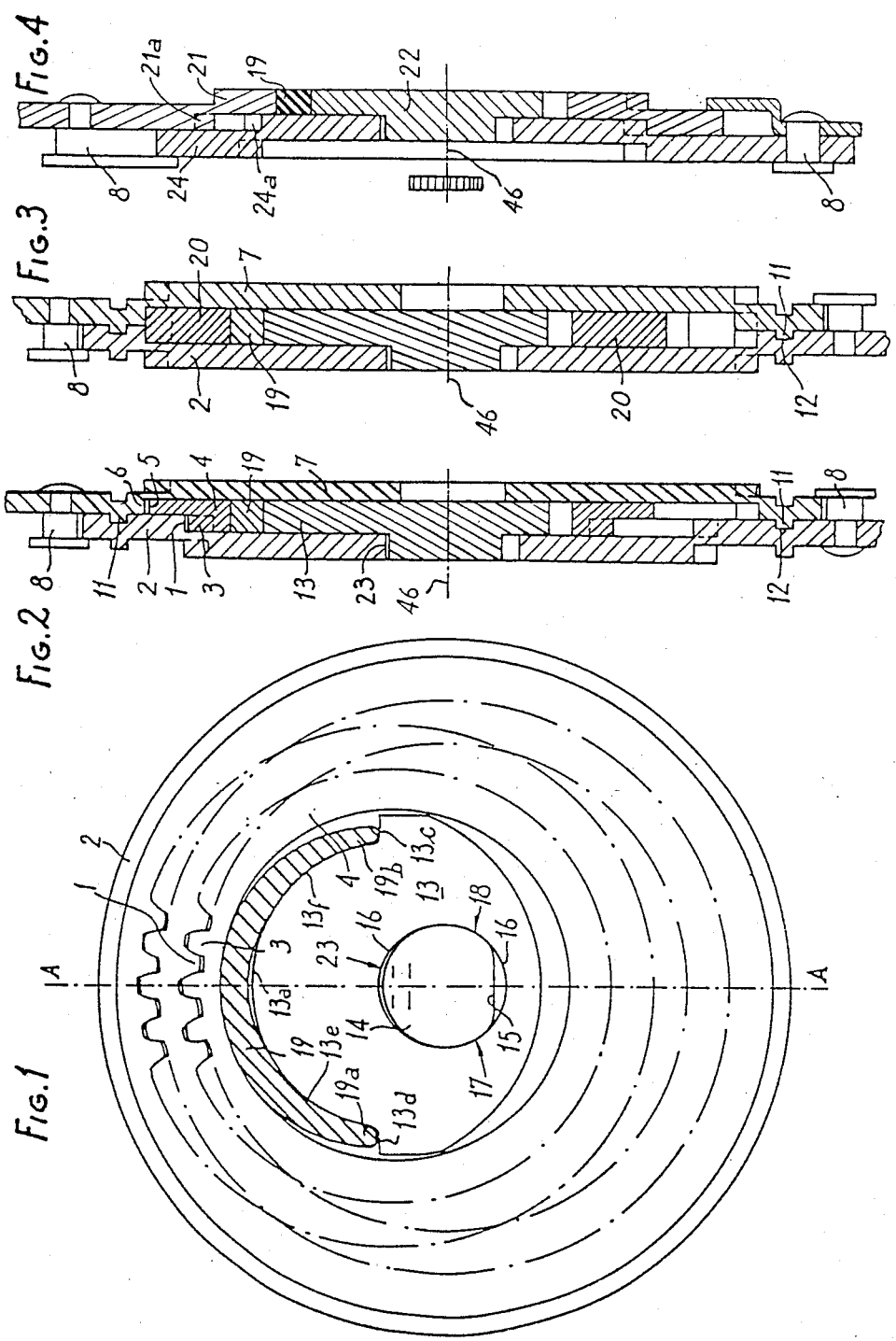

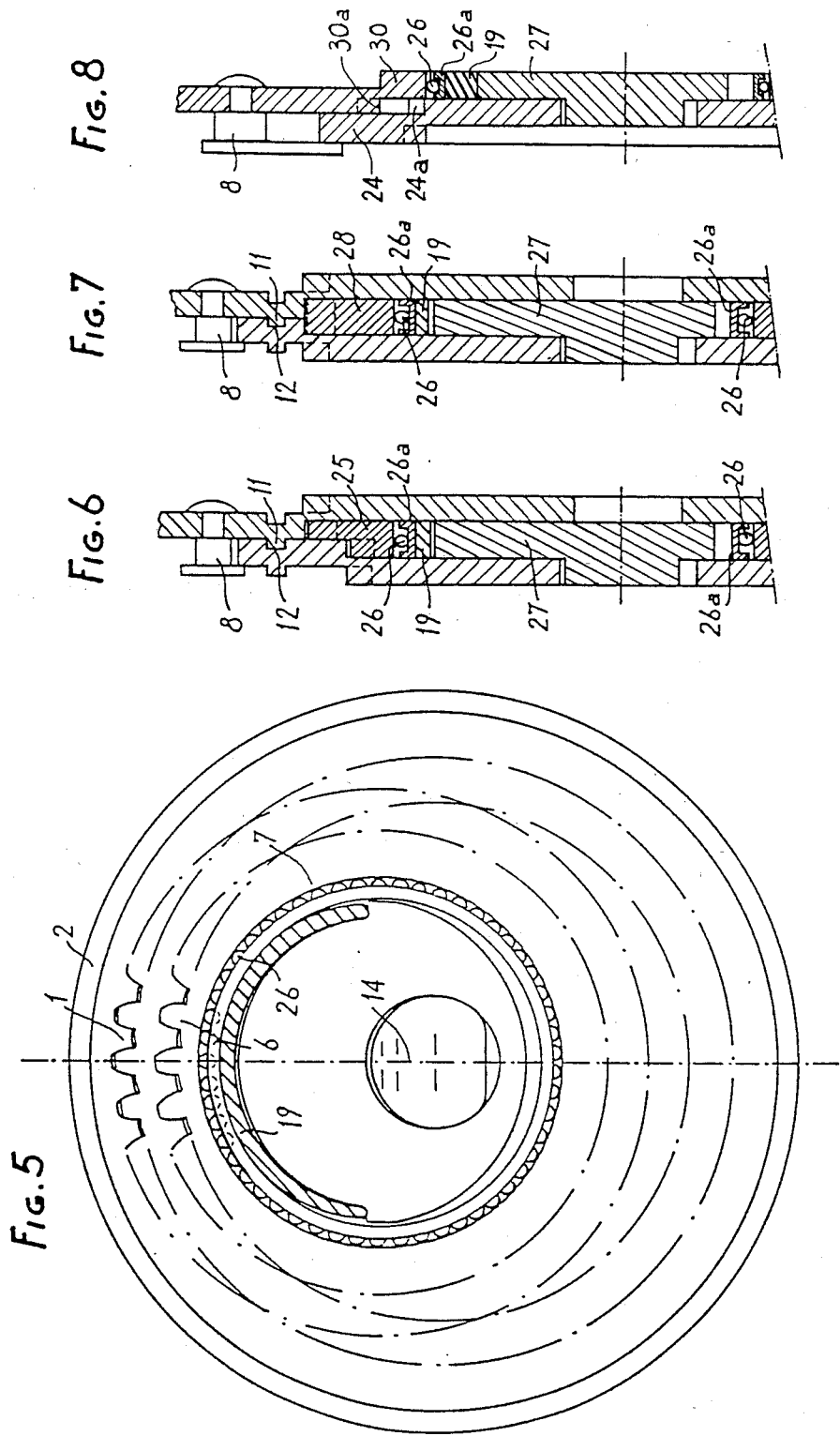

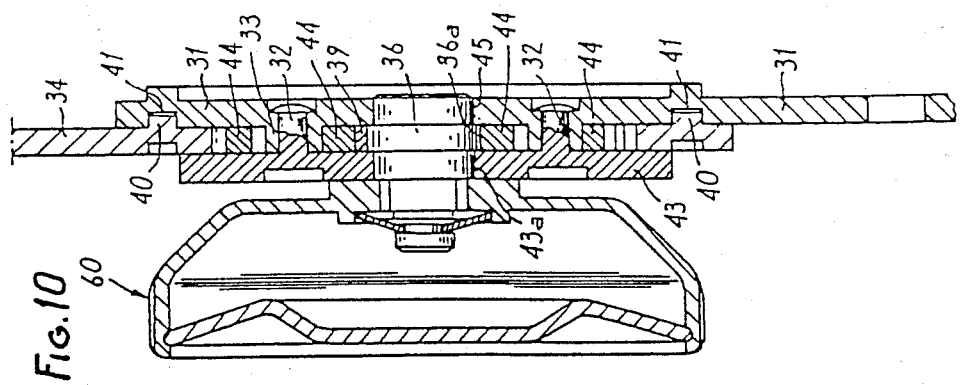
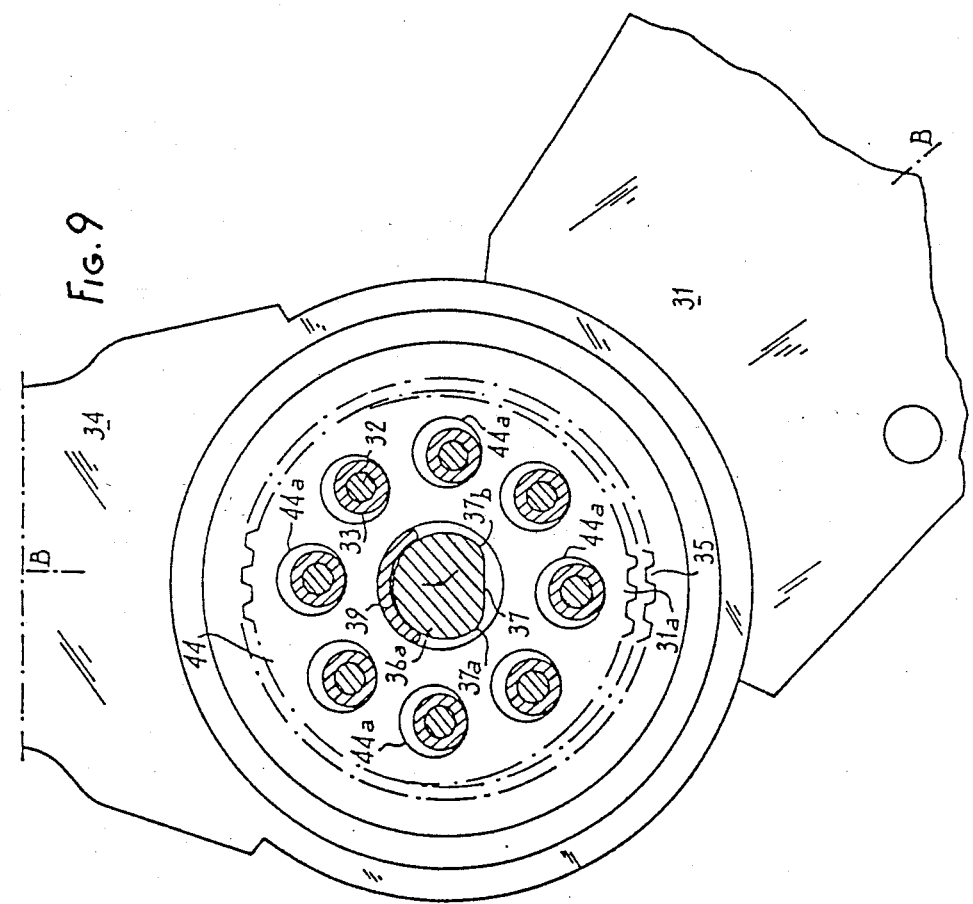

CONTINUOUS JOINT FOR VEHICLE SEAT WITH AUTOMATIC CLEARANCE COMPENSATION

The object of this invention is a continuous joint having a controlled eccentric and which is above all used to adjust the angle of the back of a vehicle seat but which can also be used to raise the seat-part of the seat (adjustment of height and angle of seat-part) as well as for other uses in order to obtain, for example, very comfortable couchette-seats.

Continuous joints with eccentric have already been known for a long time (see in particular FR-A-1 590 551) constituted by a fixed plate mounted on the seat-part of the seat, this plate terminating at its top end in a semi-circular enlargement which has on its inside toothing which engages with a single- or double-toothing planet-wheel in such a way that part at least of this planet-wheel engages with the internal toothing of a moving plate mounted on the seat-back to enable, when the eccentric or cam is rotated the planet-wheel to rotate on the internal toothing of the fixed plate thus establishing a rotational drive of the toothing of the moving plate. In some cases the toothing of the fixed plate and the toothing of the moving plate have a difference of one tooth giving an angular displacement of one tooth per revolution of the planet-wheel driven by the eccentric.

These devices have the disadvantage of large play between the components, partially necessary for the functioning of the joint, but also partially the consequence of inevitable manufacturing tolerances. Such play results in particular in fluttering of the top part of the seatback which only becomes worse over a period of use.

Patent Application EP 99549 describes a joint for an adjustable-back seat which has two plates, one connected to the seat part and the other to the seat-back, and joined together by means of a pivot-lever equipped with an eccentric. One of the plates is mounted so that it rotates around this pivot and comprises a crown-wheel with internal toothing, turning in relation to the latter. The other plate has external toothing, of smaller diameter, seated inside the first, turning in partial mesh with the latter by means of the eccentric. A tensioning element, consisting of a ring or a half-ring made of elastic compressible material is mounted between the eccentric and the bearing of the part supporting the internal toothing. This ring is arranged in such a way as to apply an elastic pressure only in the direction of the partial mesh zone of the two sets of teeth as a result of the shape of the annular seating in which it is placed. For this purpose, the annular seat comprises a thickened section on the side opposite that of the partial mesh zone.

Such a device has on the one hand the disadvantage of using an elastic compressible material, i.e. an elastomer, the compressibility and elastic return characteristics of which deteriorate as a function of time. Furthermore elastomers have unsatisfactory coefficients of friction which increases the forces necessary to actuate the adjustment device and contributes to rapid wear of the tensioning element.

Much more generally speaking, a particular cause of instability in the jointing of a seat comprising an eccentric adjusting device has been observed to be the progressive wearing of the bearings around which the device pivots. This wear is in particular an important cause of the fluttering of the seat-back in relation to the seat.

The possibility of eliminating these disadvantages has been investigated using simple and inexpensive means making it possible on the one hand to compensate for the clearances resulting from manufacturing tolerances and on the other hand to compensate for wear on the bearings around which the eccentric element pivots.

The continuous joint for a seat with an adjustable back constituting the object of this invention enables these disadvantages to be eliminated.

This joint has a fixed plate, integral with the seat-part of the seat and a moving plate integral with the seat back. An eccentric constituting a cam, provided with a bearing rotating about an axis consisting of a shaft seated in a bore hole, enables the angular position of one of the two plates to be varied in relation to the other by partial engagement of at least two toothed wheels, one integral with one of the two plates being centered on the axis around which the eccentric constituting a cam turns and the other being integral with a part driven by the eccentric constituting a cam, in such a way as to move the partial engagement zone about the axis. The eccentric constituting a cam comprises on its periphery in conformity with the invention, in the most eccentric zone in relation to the axis, an elastic bearing, made of metal or metal alloy, integral with this eccentric constituting a cam which is supported directly or indirectly against the face of revolution of the part driven by the eccentric in such a way as to maintain the toothing integral with this part held against the other set of teeth within the partial engagement zone; furthermore, at the level of the eccentric constituting a cam, whichever of the two components, shaft or hole, of the rotating bearing of this eccentric which is integral with the latter has two main support zones in relief in relation to the surface of the other component, these two bearing zones being at an angular distance of approximately 90° to 150° in relation to eachother and being arranged on either side of the plane containing the axis of the pivot of the eccentric and which passes through the partial engagement zone of these two sets of teeth.

Preferably the periphery of the eccentric constituting a cam comprises a recess extending over an angular zone of approximately 120° to 200° about the axis of rotation and which traverses the most eccentric zone of this eccentric constituting a cam; there being seated in this recess the elastic bearing with the extreme edges of this recess being arranged in such a way as to prevent angular movements of the elastic bearing.

Advantageously also the elastic bearing is curved in such a way as to be held against the bottom of the recess in two zones located on either side of its middle zone, a zone in which on the other hand it is separated from this bottom and is held flexibly, directly or indirectly, for instance by at least a line or by a surface, against the revolution face of the part driven by the eccentric constituting a cam.

Advantageously, the component of the pivot of the eccentric constituting a cam which is integral with the latter is a shaft comprising a flat part the edges of which constituting connection with the cylindrical surface constitute two main support zones in relief, located at an angular distance of 90° to 150° in relation to each other.

The pivot component of the eccentric constituting a cam which is integral with the said eccentric may also be a hole of ovoid shape, the section of which is such that a shaft seated inside it bears on this hole in two main bearing zones which are in relief and are located at an angular distance of 90–150 degrees in relation to eachother. To facilitate the rotation of the eccentric constituting a cam, a ball bearing can be mounted around it, coming between the elastic bearing and the face of revolution driven by the eccentric constituting a cam. Preferably, the cage of the ball bearing is in contact with elastic bearing.

According to a particular embodiment of the joint according to invention, the part driven by the eccentric constituting a cam is a planet-wheel comprising two sets of teeth one of which is in partial mesh with a toothing integral with the fixed plate and the other with a toothing integral with the moving plate.

According to another embodiment, the planet-wheel comprises a single toothing which is in partial mesh with the toothing integral with the fixed plate and the other toothing integral with the moving plate which has a number of teeth different from the number of teeth of the toothing of the fixed plate.

According to another embodiment of the joint in conformity with the invention the part driven by the eccentric constituting a cam constitutes an integral part of one of the two plates of the joint, one set of teeth integral with this part partially meshing with a corresponding toothing integral with the other plate.

Finally it is also possible according to the invention to use a part driven by the eccentric constituting a cam which consists of a planet-wheel comprising a single set of teeth which engages with a single toothing of one of the two plates, the other plate being driven by the planet-wheel by means of a connection which has a set of teats engaging in holes.

Many metals or metal alloys can be used to make the elastic bearing according to the invention. In particular metals or metal alloys can be used which have both good elastic properties and a low coefficient of friction, in particular in the case in which the bearing is in direct contact with the wall of the part driven by the eccentric constituting a cam.

The examples and the figures below show non-limitatively several embodiments of the continuous joint according to the invention.

FIG. 1 is a schematic vertical section showing the zone comprising the cam-shaped eccentric of a joint in conformity with the invention.

FIG. 2 shows a diagrammatic section on a diametral plate e.g. A—A of FIG. 1 of a joint according to the invention.

FIG. 3 shows a diagrammatic section along a diametral plane of a joint according to the invention which is a version of that shown in FIGS. 1 and 2.

FIG. 4 shows a diagrammatic section of a joint according to the invention without a planet-wheel.

FIG. 5 shows a diagrammatic vertical section of a joint of the type shown in FIG. 1 with ball bearing.

FIG. 6 shows a diagrammatic section along a diametral plane of the joint with planet-wheel as shown in FIG. 5.

FIG. 7 shows a diagrammatic section along a diametral plane of a joint of the type shown in FIG. 3 with ball bearing.

FIG. 8 shows a diagrammatic section along a diametral plane of a joint of the type shown in FIG. 4 with ball bearing.

FIGS. 9 and 10 show a diagrammatic view of another particular embodiment, of the joint according to the invention in vertical section as well as side- and cross-section.

FIGS. 1 and 2 show in diagrammatic form an initial embodiment of a continuous joint for adjustable-back seat according to the invention. FIG. 1 shows from the front the zone of generally circular shape of this joint, plate 2 being cut out in order to show the cam-shaped eccentric 13 together with the elastic bearing 19 and double planet-wheel 4.

FIG. 2 clearly shows the essential components of the joint and the way in which they are connected to each other. Their extensions which connect to the parts of the seat-part and back of the vehicle seat are not shown since they are well known to the engineer.

FIG. 1 also shows in a fairly diagrammatic way the internal toothing 1 of moving plate 2 in its zone of partial engagement with toothing 3 of planet-wheel 4 together with the internal toothing 6 of plate 7 in its zone of partial engagement with toothing 5 of planet-wheel 4.

As is normal with this type of joint, guides or similar structure 8 ensure the holding of fixed plate 7 against moving plate 2 and the centering of the rotational movement of the one in relation to the other is ensured by a circular crown 11 of the fixed plate penetrating a circular recess 12 of movement plate 2.

In known manner, the drive movement of planet-wheel 4 is given by an eccentric constituting a cam 13 which has essentially the shape of a heart; this eccentric 13 is integral with a rotation shaft 14 which has a flat part 15 so as to bear on the wall of hole 16 of moving plate 2 in two main contact zones 17, 18 which are, in the case shown in the figure, located essentially at 120° to eachother.

The upper zone 13a of the eccentric constituting cam 13 has a recess with an essentially semi-circular shape, occupied by an elastic bearing 19 the tapered ends 19a, 19b of which have their movement limited by stepped parts 13c–13d of eccentric 13 and bear on zones 13c, 13f of the eccentric. As can be seen in FIGS. 1 and 2 the rotation shaft 14 has a central section allowing a slight clearance 23 in the zone diametrically opposite to points 17, 18.

The elastic bearing 19 does not bear on the upper zone 13a of the eccentric constituting cam 13 but moves away from the latter to apply a pressure distributed in the present case on a surface against the wall of the hole constituting the pivot-bearing for planet-wheel 4 which surrounds the eccentric constituting cam 13 (see FIG. 1).

The joint thus described functions in the following way: by driving in rotation by means of shaft 14 the eccentric constituting a cam 13, the latter drives in its turn planet-wheel 4 the sets of teeth 3 and 5 of which, eccentric in relation to this shaft 14, engage partially with teeth sets 1 and 6; due to the different ratios of tooth numbers between the sets of teeth in mesh an angular displacement results between plates 2 and 7. As FIGS. 1, 5 and 9 show, the main bearing zones constituting reliefs e.g. 17–18, 37a–37b, being located on one side and the other of the plane passing through the axis 46 of the pivot for rotation of the eccentric and through the partial engagement zones of the teeth. The pressure exerted by the elastic bearing, directly or indirectly, on the wall of the hole in part 4, 25, 44 driven by the eccentric constituting a cam is thus perfectly shouldered by the main zones of support. This thus permits very easy compensation of the clearances between the sets of teeth engaging partially as well as play between other components and thus for the wear on shafts and the holes in which they are seated. Jerking and fluttering of the seat is thus prevented during adjustment of the angle of the seat back, and also in the case of a vehicle seat the sudden jerks resulting from acceleration or deceleration of the vehicle. This makes for excellent comfort for the user of the seat.

As is shown in FIG. 3, the joint in this case comprises a planet-wheel 20 with a single set of teeth engaging on the inner toothing of moving plate 2 and fixed plate 7. This embodiment is also well known and the functioning of this joint is identical, and since this embodiment differs from the embodiment shown in FIG. 2 only in that planet-wheel 20 has a single set of teeth. By means of elastic bearing 19 and also the central rotation shaft 14 the same compensation for play is obtained as explained above.

Finally, in FIG. 4, there is shown an embodiment in which the moving plate 21, under the action of the eccentric constituting a cam 22 engages directly, partially, with its inner teeth 21a with the teeth 24a of fixed plate 24. As in the preceding cases, the eccentric constituting a cam 22 comprises an elastic bearing 19 which exerts an elastic pressure on the bore hole constituting the bearing for rotation of moving plate 21. Shaft 14 integral with the eccentric constituting cam 22 has two main bearing zones which balance the pressure exerted by elastic bearing 19 and ensure automatic compensation of clearances.

If FIG. 5 is examined carefully, it can be seen that moving plate 2, which has internal toothing 1 and fixed plate 7 which has internal toothing 6 cooperate with the planet-wheel with double-toothing 25 (FIG. 6), but when the latter turns under the action of central shaft 14 it rolls on a ball bearing 26 inserted between the eccentric constituting a cam 27 and this planet-wheel.

As a result, the elastic bearing 19 is located under the ball bearing 26 against the internal cage 26a of bearing 26. This gives the same compensation of play as described above for the other embodiments.

FIG. 7 showing an embodiment of the joint mechanism shows a planet-wheel with a single set of teeth 28, and this embodiment is identical to that shown in FIG. 3 except for the inclusion of ball bearing 26 and the same place as described in the preceding case.

Finally, FIG. 8 shows moving plate 30 of which internal toothing 30a rolls on external 24a of fixed plate 24 moving on ball bearing 26. The elastic bearing 19 is located under ball bearing 26 on the heart-shaped part of cam 27. Functioning is identical to that for FIG. 4.

FIGS. 9 and 10 show an embodiment of the joint according to the invention in which a fixed plate 31 has, in its circular zone, hollow teats 33 inside which are inserted solid teats 32 integral with a counter plate 43 the function of which is to ensure the lateral holding of moving plate 34 and the fixing of planet-wheel 44. Moving plate 34 has an internal toothing 35 with which toothing 31a of planet-wheel 44 partially engages. The latter has circular apertures 44a which engage with teats 33 of fixed plate 31. An eccentric constituting a cam 36, of which the central rotation shaft has a flat part 37 and edges 37a and 37b, turns of bearings 43a and 45 of counter plate 43 and fixed plate 31. Edges 37a and 37b thus constitute two main support zones each located substantially at 120° in relation to this shaft in bearings 43a and 45.

An elastic bearing 39 permits compensation of the clearances between the different parts of the joint as described above. Centering of the moving plate 34 in relation to fixed plate 31 is by means of a circular crown 40 supported by the moving plate and penetrating into a circular groove 41 on the fixed plate. The rotational drive of the shaft of eccentric 36 by means of a control button 60 can thus be executed without play with all the above mentioned advantages.

As can be seen from the above descriptions, the elastic bearing 19 or 39 is fixed in relation to the engagement zone of the various sets of teeth whatever the angular position of the eccentric considered in relation to the fixed and moving plates.

As has already been described in the general description of the invention many metals or alloys can be used to make the elastic bearing according to the invention. When a ball bearing is not used between the elastic bearing and the turning face driven by the eccentric constituting a cam it is desirable to use a metal or alloy which has good elasticity characteristics and a low coefficient of friction. The coefficient of friction can also be improved if desired by appropriate surface treatments. Suitable lubrication is also possible.

It should be noted that ring 26a of the ball bearings is fixed in practice in relation to the elastic bearing under consideration. In all cases it is possible thanks to the elastic bearing 19 or 39 to compensate for manufacturing tolerances due to the fact that the eccentric constituting a cam is more eccentric by a specific value $\Delta e$, in general equal to half a tolerance interval, than the nominal value e which would normally be related to the geometry of the sets of teeth if an elastic bearing had not been provided between the eccentric constituting a cam and the turning face which it drives.

At the present design stage, the geometry of the eccentric constituting a cam is designed to permit radial displacement of the part which it drives along the vertical axis of the mechanism plus or minus half the tolerance intervals concerned via the engagement giving plus or minus $\Delta e$ whilst maintaining a minimum lateral clearance j in relation to the vertical axis of the joint, j is the minimum clearance to permit the rotational movement of the eccentric constituting a cam without the complete jamming of the mechanism.

As already stated in the general description of the invention the bore hole for the pivot of the eccentric constituting a cam can be integral with the latter. In this case it must have the two main support zones which are supported against the bearing on which a shaft rotates. This hole may in particular have an ovoid shape designed for support against the bearing of the shaft in two main bearing zones located at an angular distance of approximately 90° to 150°. In all cases these support zones must be arranged in such a way as to balance the pressure exerted by the eccentric, via the intermediate elastic bearing, on the part which it drives in order to permit the partial engagement of at least two sets of teeth with minimum play. Very many modifications or adaptations of the continuous joint object of the invention can be realised which do not go outside the field of the invention.

I claim:

1. A continuous joint for a seat with an adjustable back comprising a fixed plate integral with the seat-part of the seat and a movable plate integral with the back, said plates being laterally secured to each other in confronting relationship, one of said plates being provided with a bearing aperture disposed about a central axis (46), an eccentric constituting a cam provided with a shaft (14) seated in said bearing aperture and rotatable about said central axis enabling the angular position of one of the two plates to be varied in relation to the other by partial engagement of at least two sets of teeth, one set of teeth integral with one of the two plates being centered on said central axis about which the eccentric constituting the cam turns, and the other set of teeth being integral with a part driven by the eccentric constituting a cam in such a way as to displace around said central axis the partial engagement zone, wherein the eccentric constituting a cam (13, 22, 27, 36) has on its periphery, in the most eccentric zone in relation to the axis, an elastic bearing (19, 39) made of metal or metal alloy, integral with this eccentric constituting a cam and which is elastically held directly or indirectly against the driven face of the tooth part (4, 20, 21, 25, 28, 30, 44) driven by this eccentric constituting a cam, in such a way as to hold the set of teeth (3, 5) integral with this part against the other set of teeth (1, 6) in the partial engagement zone, and wherein the shaft is provided with two support zones (17-18, 37a-37b) to provide a reactive force to the force applied by said elastic bearing against the driven face of said tooth part, said support zones being angularly spaced 90-150 degrees apart on opposed sides of a plane containing the central axis and a diametral line symmetrically bisecting the partial engagement zone of said at least two sets of teeth.

2. A continuous joint according to claim 1 wherein the eccentric constituting a cam has on its periphery a recess which extends over an angular peripheral zone between 120-200 degrees about the axis of rotation and which traverses the zone of greatest eccentricity of said cam, said angular peripheral zone constituting a central area (13a) and side areas (13e, 13f) terminated by stepped cam portions (13d, 13c), said elastic bearing being seated in said recess with end portions of said elastic bearing abutting said stepped cam portions to prevent angular movements.

3. A joint according to claim 2 wherein the elastic bearing is curved in such a way as to arch above the central area (13a) while contacting the side areas (13e, 13f) of said recess.

4. A joint according to claim 1 wherein the two support zones (17-18, 37a-37b) are provided by a flat surface (15) on shaft (14) whose end portions react against side portions of said bearing aperture under a force applied by said elastic bearing.

5. A joint according to claim 1 wherein a ball bearing (26) is inserted between the elastic bearing (19) and the driven face of said tooth part driven by the eccentric cam.

6. Joint according to claim 1 wherein the part driven by the eccentric constituting a cam is a planet-wheel (4) which has two sets of teeth, one of which partially engages with a toothing (6) integral with the fixed plate (7) and the other with a toothing (1) integral with the moving plate (2).

7. Joint according to claim 1 wherein the part, driven by the eccentric constituting a cam, is a planet-wheel (20) with a single set of teeth which partially engages with both a toothing integral with the fixed plate (7) and a toothing integral with the moving plate (2).

8. Joint according to claim 1 wherein the part (21) driven by the eccentric constituting a cam (22) forms an integral part of one of the two plates of the joint and in that the toothing (21) integral with this component engages partially with the corresponding toothing (24a) integral with the other plate (24).

9. Joint according to claim 1 wherein the component part (44) driven by the eccentric constituting a cam is a planet-wheel comprising a single set of teeth which engages on a single toothing of one of the two plates (34) the other plate (31) being driven by the planet-wheel via a connection which has teats (33) engaging with play in holes (44a).

* * * * *